United States Patent [19]

Noguchi et al.

[11] 4,278,584

[45] Jul. 14, 1981

[54] ORGANIC FRICTION MATERIAL

[75] Inventors: Kazuo Noguchi, Iwaki; Hiroto Fujimaki, Kokubunji; Kiyoshi Tagaya, Iwaki; Shigetoshi Ajima, Iwaki; Kazutoshi Takada, Iwaki; Kensuke Okuda, Tokorozawa, all of Japan

[73] Assignee: Kureha Kagaku Kogyo Kabushiki Kaisha, Tokyo, Japan

[21] Appl. No.: 139,730

[22] Filed: Apr. 14, 1980

[30] Foreign Application Priority Data

Apr. 26, 1979 [JP] Japan .................................. 54-51937

[51] Int. Cl.$^3$ ............................................. C08L 61/06
[52] U.S. Cl. .................................. 260/38; 260/998.13
[58] Field of Search ............. 260/38, 998.13, DIG. 39

[56] References Cited

U.S. PATENT DOCUMENTS

| | | | |
|---|---|---|---|
| 4,051,097 | 9/1977 | Aldrich | 260/DIG. 39 |
| 4,119,591 | 10/1978 | Aldrich | 260/38 |
| 4,178,278 | 12/1979 | Reynolds, Jr. | 260/38 |
| 4,226,759 | 10/1980 | Chester | 260/38 |

*Primary Examiner*—Lewis T. Jacobs
*Attorney, Agent, or Firm*—Wegner & Bretschneider

[57] ABSTRACT

An organic friction material having favorable mechanical, thermal and frictional properties and comprising phenolic resin, carbon fibers, steel fibers and filler is disclosed, the organic friction material not containing any asbestos.

6 Claims, No Drawings

ORGANIC FRICTION MATERIAL

BACKGROUND AND DETAILED DESCRIPTION OF THE INVENTION

The present invention relates to an organic friction material used for brakes and clutches of automobiles and brake blocks of rail-road (rail-way) vehicles. Particularly, the present invention relates to an organic friction material not containing any asbestos, which is able to exhibit the same or more excellent performances as compared to the publicly known organic friction materials containing asbestos.

The well-known organic friction materials contain chrysotile asbestos (hereinafter referred to as asbestos) as a reinforcement, and a phenolic resin as a binder, as well as various friction adjusting agents, and the asbestos is an indispensable component which plays an important role.

Although asbestos has various excellent properties, since the harmfulness of asbestos dust to human body has recently pointed out and further the asbestos deposit has begun to show its limit, the utilization of asbestos is now under readjustment from the both points of view of resources and environmental problem.

On the other hand, accompanying the raising of speed of traffic facilities such as automobiles and electric trains, the demand for upgrading the brake material has become raised recently. Particularly, the demand for high braking efficiency under severe conditions, safety and improved durability has highly raised.

In the above-mentioned background, research and development have been carried out on the friction material not containing asbestos. As instances of prior arts, semi-metallic friction material may be mentioned such as those disclosed in U.S. Pat. Nos. 3,434,998; 3,835,118 and 4,119,591. The above-mentioned semi-metallic friction material contains organic resin as matrix and also contains fibrous or powdery metallic component. Since such a metallic component occupies a relatively large volume in the product, the specific gravity of the product itself is fairy large, and the thermal conductivity of the product is too high. These two properties are the fatal demerits of the product as a friction material.

Against the above-mentioned prior arts, the inventors of the present invention have found that a composite texture obtained by combining carbon fibers and steel fibers as the reinforcing materials exhibits an excellent frictional performance.

The present invention having the above-mentioned findings as its base, offers a novel friction material. That is, the present invention is an independent invention quite different from the prior art in view points of its technical idea and its content.

Accordingly, the object of the present invention is to offer an organic friction material comprising: carbon fibers and steel fibers as core and reinforcing materials, and a phenol resin as a binding material. Another object of the present invention is to offer an asbestos free organic friction material which is able to meet the recently raised demand for various characteristics.

Carbon fibers in general are said to be lower in friction coefficient than asbestos or glass fibers, while carbon fibers are excellent in wear resistance.

As a result of hard studies of covering the relatively low friction coefficient of carbon fibers and of developing the inherent excellent characteristic properties thereof, the inventors have arrived at the present invention.

The organic friction material of the present invention comprises: (A) 10 to 30% by volume of phenol resin; (B) 15 to 50% by volume of carbon fibers; (C) 7 to 20% by volume of steel fibers; and (D) 10 to 50% by volume of inorganic and/or organic fillers. More preferably, the sum (B+C) of volume of carbon fibers (B) and of steel fibers (C) is 25 to 60% by volume; and the ratio [(B+C)/A] of the above-mentioned sum to the volume of phenol resin (A) is 1.8 to 3.5.

As the carbon fibers, chopped fibers of 0.2 to 10 mm in average length, and of 3 to 50, preferably 3 to 30 microns in diameter are preferably used in an amount of at least 15% by volume however, the amount of over 50% by volume is not favorable because of the difficulty of molding. In addition, carbon fibers of less than 0.2 mm in average length are insufficient in reinforcing, and those of longer than 10 mm make the molding difficult.

As the steel fibers, steel or stainless-steel fibers containing 0.05 to 1.0% of carbon are preferably used. And not only the fiber-shaped one but also wooly-shaped one is utilized. For instance, shredded steel fibers or shredded steel wool may be used. As for the dimensions of steel fibers, the average length is 0.1 to 10 mm and the range of diameter is 5 to 1,000 microns. It is important that the content of the steel fibers in a friction material of the present invention is at least larger than 7% by volume. However, in the case of the content of larger than 20% by volume, the product is so heavy that it is unsuitable for practical use though it has a favorable friction coefficient.

The friction material of the present invention shows a favorable friction coefficient, an excellent wear resistance, and thermal stability, and quite surprisingly, shows a suitable thermal conductivity also. In the case where the thermal conductivity of the friction material is too high, because the heat generated by the friction conducts excessively to the oil pressure transmission system, the efficiency of the braking is reduced by, for instance, the phonomenon of vapour lock. While in the case where the thermal conductivity of the friction material is too low, because of the heat accumulation in friction surface, the quality and the performance of the friction material are reduced. The friction material of the present invention which utilizes both of carbon fibers and highly thermoconductive steel fibers, has almost the same thermal conductivity as the commercialized and broadly used friction materials using asbestos. It has not been expected that the thermal conductivity of the friction material according to the present invention is lower than that presumed value of the friction material containing steel fibers.

A composition comprising phenol resin, carbon fibers, steel fibers and filler is well mixed by agitation and then the mixture is fabricated with a compression molding technique. The carbon fibers and steel fibers are randomly three-dimensionally dispersed in the thus composite material. Accordingly, the composite material has a favorable friction coefficient, an excellent wear resistance and thermal stability. Moreover, since carbon fibers adequately intercept the conduction of heat between steel fibers, it has also a suitable thermal conductivity. As has been stated, it is necessary that the sum of the amount of carbon fibers and the amount of steel fibers in the composite material is 25 to 60% by volume and the ratio of the above-mentioned sum to the amount of phenol is larger than 1.8 in order to form a composite texture for exhibiting the excellent friction performance, however, when the above-mentioned ratio is over 3.5, the processability of the fabrication is reduced unfavorably.

As fillers, the publicly known substances generally for use in the conventional friction materials containing asbestos are also used in the present invention. For instance, an organic filler such as cashew resin dust and rubber dust, an inorganic filler such as barium sulfate, calcium carbonate and alumina and a metal such as copper and brass may be used. In the present invention, the above-mentioned organic and/or inorganic filler is used in an amount corresponding to 10 to 50% by volume of the friction material.

Although a similar composite texture resembling to the composite texture which is the characteristic feature of the present invention may be formed using a glass fiber, the friction material prepared by using the glass fibers is inferior to the friction material prepared by using carbon fibers. This fact shows the important role of carbon fiber having excellent inherent properties, wear resistance and thermal property.

In short, the friction material having a remarkably excellent friction performance of the present invention is, at the first time, obtained by forming the above-mentioned composite texture comprising the combination of carbon fibers and steel fibers.

On the other hand, some of the inventors of the present invention offered a friction material comprising carbon fibers excellent in wear resistance prepared by newly introduced process disclosed in their Japanese Patent Application Laid-Open 5907/80. The method offered therein and the publicly known method may be used as a part of a method for preparing an organic friction material of the present invention.

The followings are the more detailed explanation of the present invention while referring to Examples.

EXAMPLES 1-7

Each compound having its own composition shown in Table 1 was blended well to be an uniform mixture by a Henschel mixer and the thus obtained mixture was fabricated by heating and pressing in metal-moldes under the conditions of a temperature of 170° C. and a pressure of 200 kg/cm$^2$, and then post cured at a temperature of 180° C. for 4 hours. From the thus obtained each material, two pieces of specimen of 25×25×6 mm in dimensions were cut out, and using a Constant-Speed Friction Tester in accordance with Japanese Industrial Standard(JIS) D 4411, friction and wear characteristics of the specimen were evaluated with the method of evaluation being the intermittent method in accordance with JASO-C-418. In this test, the conditions were as follows:

Sliding velocity of 8 m/sec; pressure on surface of 20 kg/cm$^2$; Intermittent cycle of 5 sec of pressure-application and 5 sec of without applying pressure, while the test temperature is continuously raised from room temperature to 350° C. The test was so-called fade test (observing the temperature dependence of friction coefficient).

In addition, the pressure on surface of 20 kg/cm$^2$ in this test was a fairly severer condition as compared to an ordinary condition of 6 to 13 kg/cm$^2$.

The results of the test, that is, the friction coefficient at the temperature of the test and the wear loss by wear on each specimen are summarized in Table 2.

In Table 2, Examples 1 to 7 concern to the friction material according to the present invention. Table 2 also illustrates the results of evalution on the commercial friction materials for disk pad. As is seen in Table 2, the friction material of the present invention is almost equal to commercial friction materials in the level of the friction coefficient, however, superior in the level of the wear loss, that is, in the level of the wear resistance to the commercial friction material, showing the longer life in utilization.

In addition, the reduction of the friction coefficient at a high temperature of 300° C. or 350° C. (so-called the "fade" phenomenon) was never found on the Examples 1 to 7, and this finding shows the friction stability of the friction material of the present invention.

On the other hand, Comparative examples 1 and 2 concern the friction materials of which the composition does not satisfy the composition of the friction material of the present invention. Although the wear loss of the friction materials of Comparative examples is almost equal to that of the friction material of the present invention, its level of friction coefficient is lower than that of the friction material of the present invention, that is, 0.18 to 0.25 (as compared to 0.27 to 0.35 of the friction material of the present invention) unfavorable for use as a friction material.

Comparative Examples 3 and 4 concern the friction material in which asbestos and glass fibers are respectively used instead of carbon fibers in Example 2. As is seen in Table 2, although their level of friction coefficient is almost equal to that of the friction material of Example 2, their wear loss is so large as to make the material unfavorable for use as a friction material.

Table 3, shows the representative mechanical and thermal properties of the friction materials of Example 3 and a commercial friction material based on asbestos. As is seen in Table 3, the friction material of the present material almost equals to the friction material based on asbestos in mechanical properties and thermal conductivity.

As has been described, the friction material according to the present invention as compared to the commercial friction materials based on asbestos shows remarkably excellent in friction and wear properties, and on the other hand, shows almost the same favorable values in the other characteristics such as mechanical properties and thermal conductivity as those of the commercial friction material based on asbestos.

Accordingly, it will be said that the present invention provides an excellent non-asbestos friction material and renders great services to society and industries.

TABLE 1

| | | Composition of Friction Material | | | | | | | |
|---|---|---|---|---|---|---|---|---|---|
| | | | B | | | | | unit: % by volume of the material | |
| Classification | | A phenol resin[1] | carbon fiber[2] | asbestos | glass fiber | C steel fiber | D[3] | B + C | (B + C)/A |
| Example | 1 | 25 | 35 | | | 15 | 25** | 50 | 2.0 |
| | 2 | 25 | 40 | | | 15 | 20** | 55 | 2.2 |

TABLE 1-continued

Composition of Friction Material unit: % by volume of the material

| Classification | | A phenol resin[1] | B carbon fiber[2] | asbestos | glass fiber | C steel fiber | D[3] | B + C | (B + C)/A |
|---|---|---|---|---|---|---|---|---|---|
| | 3 | 20 | 40 | | | 15 | 25** | 55 | 2.75 |
| | 4 | 15 | 30 | | | 15 | 40** | 45 | 3.0 |
| | 5 | 25 | 50 | | | 10 | 15* | 60 | 2.4 |
| | 6 | 25 | 45 | | | 10 | 20** | 55 | 2.2 |
| | 7 | 15 | 20 | | | 20 | 45** | 40 | 2.67 |
| Comparative example | 1 | 30 | 30 | | | 15 | 25** | 45 | 1.5 |
| | 2 | 15 | 45 | | | 15 | 25** | 60 | 4.0 |
| | 3 | 25 | | 40 | | 15 | 20** | 55 | 2.2 |
| | 4 | 25 | | | 40 | 15 | 20** | 55 | 2.2 |

Notes:
[1]phenol resin modified by cashew resin; CASHEW CO., LTD.
[2]carbon fiber derived from pitch, of 0.7 mm in average length: KUREHA CHEMICAL INDUSTRY CO., LTD.
[3]inorganic and/or organic filler
*barium sulfate.
**composed at least 60% of barium sulfate.

TABLE 2

Friction Properties of Friction Material

| Classification | | Coefficient of friction at a temperature of (°C.) | | | | | | Wear loss | |
|---|---|---|---|---|---|---|---|---|---|
| | | 100 | 150 | 200 | 250 | 300 | 350 | Wear weight (g) | Wear length (mm) |
| Example | 1 | 0.31 | 0.30 | 0.32 | 0.31 | 0.32 | 0.31 | 0.24 | 7 × 10⁻² |
| | 2 | 0.31 | 0.30 | 0.31 | 0.30 | 0.31 | 0.30 | 0.25 | 8 × 10⁻² |
| | 3 | 0.29 | 0.29 | 0.31 | 0.30 | 0.32 | 0.32 | 0.22 | 7 × 10⁻² |
| | 4 | 0.31 | 0.34 | 0.34 | 0.34 | 0.35 | 0.35 | 0.39 | 11 × 10⁻² |
| | 5 | 0.27 | 0.27 | 0.28 | 0.28 | 0.27 | 0.29 | 0.35 | 16 × 10⁻² |
| | 6 | 0.27 | 0.28 | 0.29 | 0.29 | 0.30 | 0.30 | 0.34 | 8 × 10⁻² |
| | 7 | 0.33 | 0.34 | 0.34 | 0.33 | 0.32 | 0.33 | 0.54 | 21 × 10⁻² |
| Comparative example | 1 | 0.18 | 0.19 | 0.20 | 0.19 | 0.21 | 0.21 | 0.37 | 15 × 10⁻² |
| | 2 | 0.25 | 0.24 | 0.22 | 0.21 | 0.19 | 0.19 | 0.35 | 16 × 10⁻² |
| | 3 | 0.29 | 0.29 | 0.28 | 0.30 | 0.29 | 0.28 | 2.54 | 79 × 10⁻² |
| | 4 | 0.31 | 0.33 | 0.34 | 0.34 | 0.35 | 0.36 | 3.73 | 114 × 10⁻² |
| A commercial friction material[1] | | 0.32 | 0.33 | 0.32 | 0.34 | 0.32 | 0.30 | 0.91 | 35 × 10⁻² |

Note:
[1]based on asbestos.

$$\text{TABLE 3}$$

Mechanical properties and the Thermal Conductivity of Friction Material

| Classification | Apparent density (g/ml) | Hardness, Rockwell ($H_{RL}$) | Flexural strength (kg/mm²) | Flexural modulus (kg/mm²) | Impact strength, Izod* | Thermal conductivity (cal/cm . sec . °C.) |
|---|---|---|---|---|---|---|
| Example 3 | 2.46 | 80.1 | 5.95 | 900 | 4.7 | 1.85 × 10⁻³ |
| Commercial friction material (based on asbestos) | 2 to 2.5 | 60 to 80 | 2 to 5 | 450 to 900 | 4 to 5 | (1.3 to 2.5) × 10⁻³ |

Note:
Impact strength, Izod: unnotched, unit being kg . cm/cm².

What is claimed is:
1. An organic friction material comprising:
   (a) 10 to 30% by volume of phenol-formaldehyde resin,
   (b) 15 to 50% by volume of carbon fibers,
   (c) 7 to 20% by volume of steel fibers, and
   (d) 10 to 15% by volume of inorganic- and/or organic fillers.
2. The organic friction material according to claim 1, wherein the sum of volume of said carbon fibers and of said steel fibers is 25 to 60%, and the ratio of said sum to the volume of said phenolic resin is 1.8 to 3.5.
3. The organic friction material according to claim 1, wherein said carbon fibers are chopped fibers having an average length of 0.2 to 10 mm and an average diameter of 3 to 50 microns.
4. The organic friction material according to claim 1, wherein said steel fibers are of steel and/or of stainless steel containing 0.05 to 1% by weight of carbon.
5. The organic friction material according to claim 4, wherein said steel fibers are shredded steel fibers and/or shredded steel wool.
6. The organic friction material according to claim 1, wherein said carbon fibers are prepared from pitch.

* * * * *